United States Patent [19]

Wehr

[11] 4,086,705
[45] May 2, 1978

[54] DRY CLEANING SYSTEM WITH SOLVENT RECOVERY

[76] Inventor: Robert L. Wehr, 5893 Sunset Dr., Hudson, Ohio 44236

[21] Appl. No.: 783,683

[22] Filed: Apr. 1, 1977

[51] Int. Cl.² .............................................. F26B 3/00
[52] U.S. Cl. ........................................ 34/26; 34/32; 34/73; 34/75; 34/77; 68/18 R; 68/18 C; 8/142
[58] Field of Search ..................................... 34/72–78, 34/23, 26, 32; 68/18 R, 18 C, 19, 20; 8/142

[56] References Cited

U.S. PATENT DOCUMENTS

| | | | |
|---|---|---|---|
| 2,198,412 | 4/1940 | McDonald | 34/73 |
| 2,681,512 | 6/1954 | Armstrong | 34/75 |
| 3,236,073 | 2/1966 | Davison et al. | 34/77 |
| 3,306,083 | 2/1967 | Lornitzo | 68/18 R |
| 3,323,335 | 6/1967 | Schneider | 68/18 R |

*Primary Examiner*—Kenneth W. Sprague
*Assistant Examiner*—James C. Yeung
*Attorney, Agent, or Firm*—David A. Burge Co.

[57] ABSTRACT

Petroleum solvent vapors which discharge from a dry cleaning dryer in a heated gaseous mixture of vapors and air are condensed and recovered, and heat energy is recovered for productive use elsewhere. The gaseous mixture of vapors and air is sprayed with relatively cool water to condense the solvent vapors. The resulting liquid mixture of water and solvent is withdrawn from the spray chamber and is subjected to gravitational separation. Water reclaimed in the separation process is reused in the spray chamber. Recovered solvent is reused in a dry cleaning washer. The gravitational separation process is preferably carried out in a series of gravitational separators, and heat is withdrawn from at least one of the separation units for productive use in a heat consuming device.

19 Claims, 2 Drawing Figures

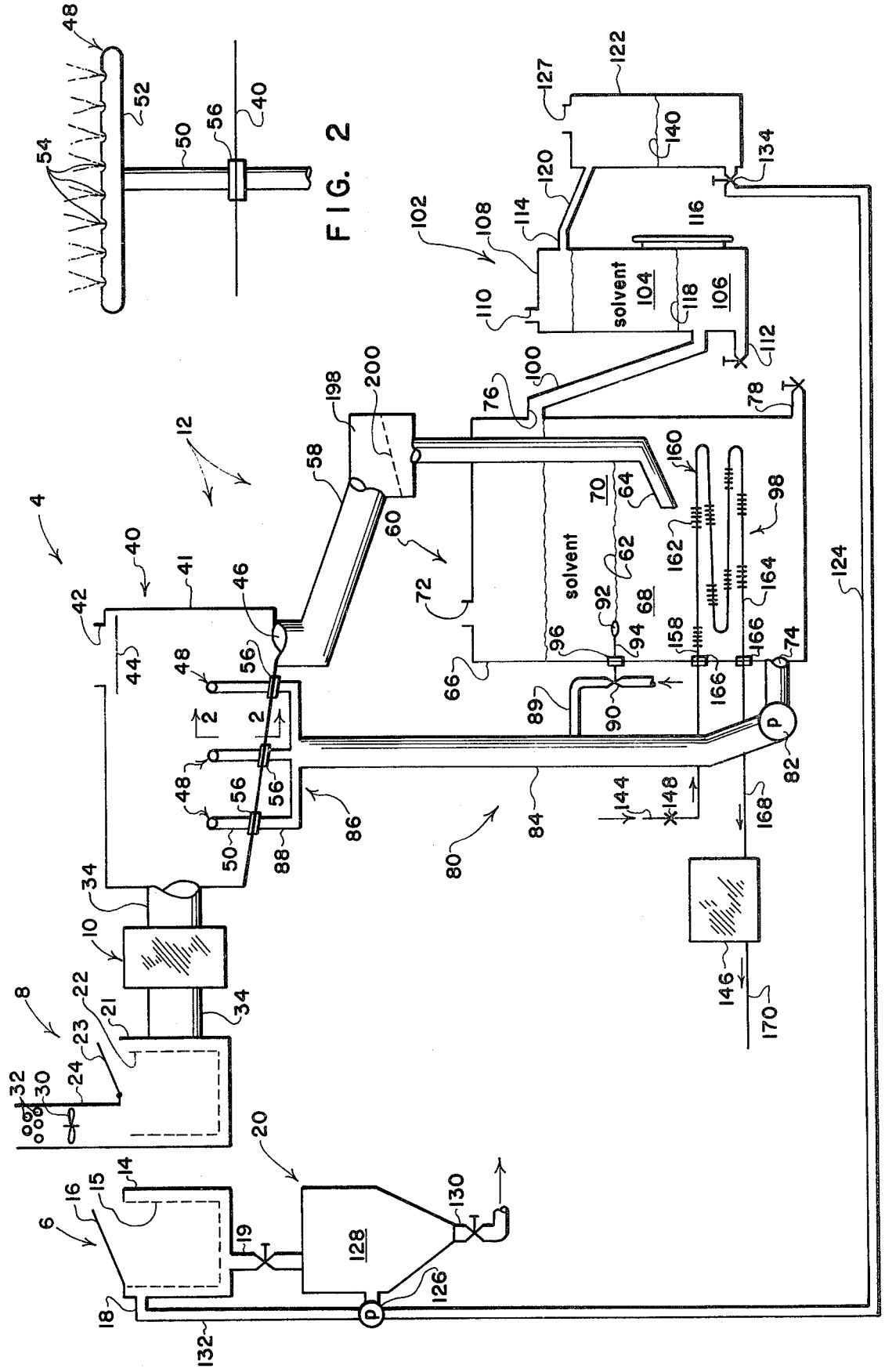

DRY CLEANING SYSTEM WITH SOLVENT RECOVERY

BACKGROUND OF THE INVENTION

1. Field of the Invention

The present invention relates generally to dry cleaning systems, and more particularly to a dry cleaning system wherein petroleum solvent vapors discharging from a dry cleaning dryer are condensed and the condensed solvent vapors are separated from a condensing liquid so the liquid solvent may be reused.

2. Prior Art

There are two distinct types of solvents used in the dry cleaning industry, namely "synthetic solvents" and "petroleum solvents." The so-called "synthetic solvents" are halogenated hydrocarbons such as perchloroethylene, 1,1,2-trichloro-1,2,2-trifluoroethane (Freon 113), trichlorethylene, carbon tetrachloride, and the like. The so-called "petroleum solvents" are petroleum distillate fractions and have been categorized by the International Fabricare Institute as being of various types including Stoddard solvents, solvents meeting "140-F" specifications, odorless solvents, low end point solvents and the like. Due to its acceptance in the industry, the term "petroleum solvent" is here intended to include petroleum distillate fractions used as dry cleaning solvents while the term "synthetic solvent" is intended to include halogenated or similarly treated hydrocarbons used as dry cleaning solvents.

The synthetic solvents are characteristically expensive and have, in the prior art, been reclaimed by condensing solvent vapors for reuse as disclosed in U.S. Pat. Nos. RE 19,986 and 3,110,544. Condensation units designed to reclaim synthetic solvents are expensive systems normally incorporating substantial lengths of cold water condensing coils. Petroleum solvents, on the other hand, are substantially less expensive and their vapors have been discarded, although the condensation and recovery thereof is suggested in U.S. Pat. No. 1,795,006. The accepted practice of discarding petroleum solvent vapors is a substantial waste of a valuable chemical resource.

In addition to the problem that venting solvent vapors to the atmosphere is wasteful, it also creates an air pollution problem. Yet, at present, the only commercially available solutions to the recovery of petroleum solvent vapors require the use of either carbon absorption units or the use of the same condensation type reclamation units that are used to recover synthetic solvent vapors. Both of these solutions are regarded by the industry as far too expensive to warrant adoption for the recovery of petroleum solvent vapors. While the air pollution problem could conceivably be resolved by burning the vapors, this solution is unproven and could create additional unforeseeable air pollution problems. Moreover, burning the vapors provides no recovery of the solvent for reuse.

Still another drawback of present day systems which discharge heated mixtures of petroleum solvent vapors and air to the atmosphere is that no recovery is made of the substantial amount of heat energy in these mixtures. Much heat energy is wasted by these systems.

SUMMARY OF THE INVENTION

The present invention overcomes the foregoing and other drawbacks of prior proposals, and provides a relatively inexpensive technique for recovering valuable petroleum solvent and heat energy from gaseous mixtures discharged from dry cleaning dryers, and for concomitantly reducing the amount of vented petroleum solvent vapors thereby minimizing airborne contaminates.

In the preferred practice of the present invention, the mixture of hot air and petroleum solvent vapors which discharges from a dry cleaning dryer is passed through a lint remover and into a spray chamber where relatively cool water is sprayed into the heated gaseous mixture. The solvent vapors condense and form, with the water, a liquid mixture. As the vapors condense, they sacrifice heat to the liquid mixture. Vented from the spray chamber is a cooled gaseous mixture of air, water vapor and a very small quantity of solvent vapor. Withdrawn from the spray chamber is a heated liquid mixture of water and solvent.

The water-solvent mixture gravitates into a primary gravitational separator which is of significant volume and provides a long residence time in an environment with a low vertical liquid velocity. Due to the specific gravity difference between water and the solvent, the liquid components separate quite readily into an upper solvent layer and a lower water layer. Due to the long residence time in the primary separator, such particulates as may remain in the water-solvent mixture following lint filtration drop out in the primary separator and can be periodically removed. The solvent eventually accumulates in the primary separator so that its level rises to a solvent outlet and passes into a secondary separator where additional water and/or particulates are allowed to drop out of suspension. Solvent from the secondary separator is delivered into a storage tank and is ultimately returned to a dry cleaning washer for reuse.

Spray water is recycled after being collected in the primary separator. Due to a loss of water vapor from the spray chamber, additional make-up water is added to the spray system as needed. The need for additional water is sensed by determining the water level in the primary separator.

Heat energy is withdrawn from the liquid water-solvent mixture via a heat exchange coil located in the primary separator. Ambient temperature water is circulated through the heat exchange oil and is heated by the mixture for productive use in a suitable heat consuming device. The recovered heat energy can be used to preheat wash water or for any other suitable heat consuming use.

As will be apparent from the foregoing summary, it is a general object of the present invention to provide a novel and improved dry cleaning system featuring recovery of petroleum solvent vapors discharged from one or more petroleum solvent dryers.

Other objects and a fuller understanding of the invention may be had by referring to the following description and claims taken in conjunction with the accompanying drawings.

BRIEF DESCRIPTION OF THE DRAWINGS

FIG. 1 is a schematic illustration, partly in cross-section and partly in elevation, of a dry cleaning system embodying certain features of the preferred practice of the present invention; and, FIG. 2 is an enlarged sectional view of a portion of a spray chamber illustrated in FIG. 1, as seen substantially from a plane indicated by a line 2—2 in FIG. 1.

DESCRIPTION OF THE PREFERRED EMBODIMENT

Referring to FIG. 1, a dry cleaning system 4 includes a dry cleaning washer 6, a dry cleaning dryer 8, a lint collector 10, and a petroleum solvent recovery system indicated generally by the numeral 12.

The washer, dryer, and lint collector units 6, 8, 10 are conventional, commercially available apparatus. A suitable washer is sold by Washex Machinery Corporation of Wichita Falls, Tex. 76306, under the model designation 500FPA. A suitable dryer is sold by Challenge-Cook Brothers, Inc. of Industry, Calif. 91745, under the model designation DFSD-4. A suitable line removal unit is sold by ECI Air-Flyte Corporation of Fairfield, N.J. 07006.

The washer 6 includes an enclosure 14 which houses a perforated drum 15 into which fabrics may be loaded for washing in the presence of a petroleum solvent. A suitable door 16 provides access to the drum 15. At the inception of a dry cleaning washing cycle, a liquid petroleum dry cleaning solvent is admitted into the enclosure 14 through a suitable fitting 18. At the end of the washing cycle, liquid is drawn off through a valved conduit 19 and the load extracted to a damp condition with liquid returning to a liquid solvent treating unit 20.

The dryer 8 includes an enclosure 21 which houses a perforate drum 22 into which washed and solvent-extracted fabrics are loaded for vaporizing the remaining solvent. A suitable door 23 provides access to the drum 22. An air inlet 24 communicates the interior of the enclosure 21 with the atmosphere.

During a drying cycle, a fan 30 draws air into the enclosure 21 through the inlet 24. Air passing through the inlet 24 is heated, by any suitable means, such as a steam coil 32, to evaporate liquid solvent remaining or sorbed on fabric in the drum 22. A mixture of hot air and hot solvent vapor exits from the dryer 8 through a conduit 34 and through the lint removal unit 10.

The temperature of the heated air passing through the dryer 8 during the drying cycle depends on the boiling point of the solvent employed. Typical temperatures are in the range of 120°–170° F which is sufficient to rapidly evaporate liquid solvent.

A typical 400 pound load petroleum solvent dryer exhausts a mixture of hot air-solvent vapor at a range of 9,000–12,000 cubic feet per minute and exhausts about 12 gallons of solvent vapor to the atmosphere during each complete cycle of operation. Because a typical dryer operates at about two cycles per hour, it will be evident that there is delivered to the atmosphere a considerable quantity of hydrocarbon vapor which constitutes an air pollution problem and which can be valuable if recovered. Moreover, the exhausted solvent vapor and air mixture carries with it a substantial amount of heat energy which could be used productively if reclaimed.

The conduit 34 delivers the hot air-solvent vapor mixture from the dryer 8 through the lint collection unit 10 to the solvent vapor recovery system 12. The system 12 has a spray chamber 40 including a large receptacle 41 having an upwardly directed atmospheric vent 42 immediately above a baffle plate 44, a downwardly directed liquid outlet 46, and a plurality of spray heads 48 for spraying a condensing liquid such as water into the chamber 40. The spray heads 48 may be of any suitable type and are illustrated in FIG. 2 as comprising an upright conduit 50 connected to a cross conduit 52. A plurality of spray openings 54 are provided in the cross conduit 52. The upright conduits 50 are sealed against the bottom of the receptacle 41 by suitable connectors 56.

A major factor affecting operational efficiency of the spray chamber 40 is its operating temperature. Naturally, the inlet temperature will approach the drying temperature of the dryer 8. In a typical design, the temperature of the exhaust gases exiting through the vent 42 will be in the range of 70° to 170° F. The inlet temperature of the condensing liquid also substantially affects efficiency of the spray chamber 40. Desirably, inlet water temperature is in the range of 80° to 85°.

Another major factor affecting operational efficiency in the chamber 40 is the tendency for condensed solvent to separate from air and water vapor flowing therethrough. Accordingly, the spray chamber 40 should be of sufficient size so that the upward gas velocity toward the gas outlet 42 is sufficiently low to allow any liquid droplets formed by the condensing solvent vapor to drop out of suspension by gravity. In general, gas velocities on the order of 5 to 10 feet per second are necessary to move liquid droplets vertically. Consequently, the horizontal cross-sectional area of the chamber 50 should be sufficient to lower the upward gas velocity substantially below 5 feet per second. In an installation designed to handle 9,000 cubic feet per minute of air-solvent vapor mixture, a spray chamber 8 feet × 8 feet × 8 feet will reduce the gas velocity substantially below 2.5 feet per second. Accordingly, any liquid solvent droplets will fall out of suspension and, because of the inclined floor of the chamber 40, these droplets will gravitate to the liquid outlet 46.

A liquid drainpipe 58 extends from the liquid outlet 46 into the interior of a primary separator 60. The primary separator 60 may be of the centrifugal variety but is preferably of the gravitational type. The drainpipe 58 preferably extends below the normal water level 62 in the gravitational separator 60 and desirably has a downwardly inclined discharge end 64 to spread the effluent mixture across the cross-sectional area of the separator 60 to prevent particulate buildup immediately below the discharge end 64. The primary separator 60 comprises a vessel 66 of significant height and sufficient cross-sectional area to allow gravitational separation of water and solvent into distinct layers 68, 70 respectively. The vessel 66 provides an upwardly opening atmospheric vent or outlet 72, a water outlet 74 toward the bottom thereof, and a solvent outlet 76 in an upper sidewall portion thereof. A valved conduit 78 opens into the interior of the vessel 66 below the water outlet 74 for removing accumulated particulates as by dumping to a suitable sewer connection.

The size of the solvent recovery system 12, including such components as the spray chamber 40 and the vessel 66, depends on the total output of the number of dryers 8 which feed air and solvent vapor mixtures into the chamber 40 for separation. As will be apparent, the vessel 66 will be required to handle a large quantity of liquid if several large capacity dryers feed into the chamber 40, and will be required to handle a much smaller quantity of liquid if only a single, small capacity dryer feeds into the chamber 40. As will be explained more fully hereinafter in conjunction with a water circulation system 80, a typical installation for a 400 pound petroleum solvent unit as previously discussed will require the delivery of 50 to 75 gallons per minute of water through the circulation system 80, depending on the temperature of the delivered water. Accordingly, the vessel 66 may be on the order of 1500 to 2000 gallons working capacity.

The water circulation system 80 includes a pump 82 of sufficient size to handle the requisite quantity of condensing liquid. The pump 82 has an inlet in communication with the water outlet 74, and has an outlet in communication with a conduit 84. The cnduit 84 communicates with a liquid manifold 86 having a leg 88 extending in communication with the vertical conduits 50 of the spray heads 48.

Because a significant quantity of water is lost in the form of vented vapor, it is necessary to periodically add water to the system. To this end, a water make-up line 89 is connected from a suitable source to the conduit 84 and is provided with a liquid level conduit valve 90. The valve 90 is operated in any suitable fashion, as by the provision of a float 92 having a density less than water but greater than that of the petroleum solvent being recovered. The float 92 operates through any suitable control linkage 94 sealed against the vessel 66 by a suitable connector 96. As the water level 62 is lowered, as naturally occurs due to the loss of vented water vapor in the spray chamber 40, the float 92 is caused to move downwardly thereby opening the valve 90 and delivering make-up water into the conduit 84. As soon as the water level 62 rises to an appropriate level, the float 92 acts through the linkage 94 to close the valve 90.

Make-up water is preferably delivered into the conduit 84 rather than into the separator 60 for several reasons. First, the condensing efficiency in the spray chamber 40 depends, to a substantial extent, on the temperature of water delivered through the spray heads 48. By adding make-up water to the conduit 84, it is evident that the temperatures of delivered water is as low as possible. Second, as will be discussed hereinafter in conjunction with a heat recovery system 98, it is desired to remove significant quantities of heat from liquid in the vessel 66. Consequently, it would be self-defeating to admit relatively cool water into the separator 60.

The solvent outlet 76 of the primary separator 60 is connected by a drainpipe 100 to the lower end of a secondary separator 102. The secondary separator 102 may be of the centrifugal type but is preferably gravitational, permitting additional separation between a solvent layer 104 and a water layer 106 to occur. The secondary separator 102 comprises a much smaller vessel 108 than is used in the primary separator 60. The vessel 108 is provided with an atmospheric vent 110, a valved water-sediment outlet 112 for connection to a sewer line, a solvent outlet 114, and a suitable sight glass 116 for visually locating the water level 118. The sight glass 116 allows an operator to drain water from the vessel 108 when the water level 118 becomes too high.

If only one dryer 8 is incorporated in the dry cleaning system 4, the quantity of liquid handled by the secondary separator 102 is rather small. Assuming a loss of 12 gallons of petroleum solvent in vapor form per operation cycle, two cycles per hour, 70% recovery efficiency in the spray chamber 40 and 90% separation efficiency in the primary separator 60, a total quantity of liquid handled by the separator 102 will be less than about 20 gallons per hour. Accordingly, a 30 gallon working capacity separator will provide a residence time of greater than 1.5 hours in the vessel 108.

The solvent outlet 114 is connected through a suitable conduit 120 to a solvent storage tank 122 which may be above or below ground and which is in turn connected by a suitable conduit 124 to a solvent pump 126. An atmospheric vent 127 is provided in the top of the tank 122. The solvent pump 126 is adapted to receive liquid solvent from a solvent tank 128 which forms part of the liquid solvent treating system 20. The solvent tank 128 has a valved outlet 130 for periodically removing sediment from the tank's bottom. The solvent pump 126 is arranged to deliver liquid solvent through a conduit 132 to the solvent inlet fitting 18 of the washer 6. A valve 134 is interposed in the conduit 132.

It should be evident that the liquid solvent treating system 20 may be more sophisticated than a simple settling tank. Specifically, a conventional still (not shown) may be provided to distill a portion or all of the liquid solvent accumulating in either of the storage tanks 122, 128.

The heat recovery system 98 comprises an inlet line 144, a heat exchange coil 160, and an outlet line 168. The components 144, 160, 168 can form part of a closed circulation heat exchange system, but are shown in FIG. 1 as comprising a system for pre-heating inlet water for a water heater 146. In the embodiment of FIG. 1, the inlet line 144 is connected to a source of pressurized water, and the outlet line 168 feeds water to the hot water heater 146. Water which has been heated in the hot water heater 146 exits through a supply line 170. While the hot water heater 146 has been shown in FIG. 1, it will be understood that the heat using device 146 may be of any desired type.

The inlet conduit 144 extends through the wall of the vessel 66 and connects to an inlet leg 158 of the heat exchange coil 160 of any suitable type preferably having a plurality of heat exchange fins 162 thereon. The coil 160 has an outlet leg 164 extending through the wall of the vessel 66. The inlet and outlet legs 158, 164 are sealed to the wall of the vessel 66 by suitable connectors 166. A suitable conduit 168 delivers partially heated water from the coil 160 to the hot water heater 146.

Because the water layer 68 in the separator 60 is at an elevated temperature, it will be apparent that preheating of the water supply to the hot water heater 146 occurs. It will also be apparent that preheating of water delivered to the water heater 146 acts to lower the temperature of liquid in the vessel 66, thereby lowering the temperature of water delivered to the spray heads 48. Because recovery efficiency in the chamber 40 is partially dependent on inlet water temperature, it will be seen that withdrawing heat from the separator 60 acts to increase efficiency of the solvent vapor recovery system 12.

While it is ordinarily desirable to conduct the lint separation and solvent-vapor recovery steps in separate and distinct operations, these steps can be combined and carried out utilizing the spray chamber 40 for both functions. If lint remains in the mixture of solvent and air vapor which enters the chamber 40, the spray water impinging on it will cause it to settle to the bottom of the chamber 40. A screening chamber 198 can be provided in the conduit 58 and an accessibly removable screen 200 can be inserted within the chamber 198 to collect the lint.

Although the invention has been described in its preferred forms with a certain degree of particularity, it is understood that the present disclosure of the preferred forms has been made only by way of example and numerous changes in the details of construction and the combination and arrangement of parts may be resorted to without departing from the spirit and the scope of the invention as hereinafter claimed. It is intended that the patent shall cover, by suitable expression in the appended claims, whatever features of patentable novelty exist in the invention disclosed.

What is claimed is:

1. A dry cleaning system comprising:
   (a) dry cleaning means for receiving soiled fabric, for washing soiled fabric in the presence of a liquid petroleum solvent, for withdrawing liquid petroleum solvent from the washed fabric, for passing heated air around and through the fabric for evaporating liquid petroleum solvent sorbed on the fabric, and for exhausting a gaseous mixture of heated air and petroleum solvent vapor through an exhaust outlet; and,
   (b) a petroleum solvent vapor recovery system including:
      (i) a condensing chamber in fluid receiving relation with the exhaust outlet providing a path of mixture movement thereinto, a gas outlet, and a liquid outlet;
      (ii) means for spraying a condensing liquid into the path of mixture movement for condensing the petroleum solvent vapor;
      (iii) means in liquid receiving relation with the chamber liquid outlet for separating the condensing liquid from the condensed petroleum solvent, including:
         (a) a first separator of substantial capacity having a condensing liquid outlet and a solvent outlet; and
         (b) a second separator of smaller capacity than the first separator, the second separator being in communication with the first separator solvent outlet and having a solvent outlet and a condensing liquid outlet;
      (iv) means in condensing liquid receiving relation with the condensing liquid outlet for delivering condensing liquid to the spraying means; and,
      (v) means in liquid solvent receiving relation with the solvent outlet of the second separator for returning condensed petroleum solvent to the dry cleaning means for reuse in a subsequent fabric washing cycle.

2. The system of claim 1 wherein the capacity of the first separator is at least an order of magnitude greater than the capacity of the second separator.

3. The system of claim 2 wherein the first and second separators are gravitational separators.

4. A dry cleaning system comprising:
   (a) dry cleaning means for receiving soiled fabric, for washing soiled fabric in the presence of a liquid petroleum solvent, for withdrawing liquid petroleum solvent from the washed fabric, for passing heated air around and through the fabric for evaporating liquid petroleum solvent sorbed on the fabric, and for exhausting a gaseous mixture of heated air and petroleum solvent vapor through an exhaust outlet; and,
   (b) a petroleum solvent vapor recovery system including:
      (i) a condensing chamber in fluid receiving relation with the exhaust outlet providing a path of mixture movement thereinto, a gas outlet, and a liquid outlet;
      (ii) means for spraying a condensing liquid into the path of mixture movement for condensing the petroleum vapor solvent;
      (iii) means in liquid receiving relation with the chamber liquid outlet for separating the condensing liquid from the condensed petroleum solvent;
      (iv) means in condensing liquid receiving relation with the separating means for delivering condensing liquid to the spraying means;
      (v) means in liquid solvent receiving relation with the separating means for returning condensed petroleum solvent to the dry cleaning means for reuse in a subsequent fabric washing cycle; and,
      (vi) a vessel for receiving relatively hot condensing liquid after passage through the condensing chamber, and
      (vii) means for withdrawing heat from the hot condensing liquid including means for circulating a fluid, cooler than the condensing liquid, in heat exchanging relation with the condensing liquid, a heat consuming device and means for delivering the circulated fluid to the heat consuming device.

5. The system of claim 4 wherein the separating means includes a gravitational separator including a receptacle in liquid receiving relation with the chamber liquid outlet for segregating the liquid mixture into component layers, the separator receptacle being the vessel.

6. The system of claim 5 wherein the fluid circulating means includes a heat exchange tube in the vessel.

7. A dry cleaning system comprising:
   (a) dry cleaning means for receiving soiled fabric, for washing soiled fabric in the presence of a liquid petroleum solvent, for withdrawing liquid petroleum solvent from the washed fabric, for passing heated air around and through the fabric for evaporating liquid petroleum solvent sorbed on the fabric, and for exhausting a gaseous mixture of heated air and petroleum solvent vapor through an exhaust outlet; and,
   (b) a petroleum solvent vapor recovery system including:
      (i) a condensing chamber in fluid receiving relation with the exhaust outlet providing a path of mixture movement thereinto, a gas outlet, and a liquid outlet;
      (ii) means for spraying a condensing liquid of higher specific gravity than the petroleum solvent into the path of mixture movement for condensing the petroleum solvent vapor;
      (iii) means in liquid receiving relation with the chamber liquid outlet for separating the condensing liquid from the condensed petroleum solvent including a gravitational separator having a condensing liquid outlet adjacent the bottom thereof and a liquid solvent outlet above the condensing liquid outlet ;
      (iv) means in condensing liquid receiving relation with the separating means for delivering condensing liquid to the spraying means including means for admitting make-up condensing liquid comprising a liquid level controlled valve responsive to the level of condensing liquid between the condensing liquid outlet and the liquid solvent outlet; and,
      (v) means in liquid solvent receiving relation with the separator for returning condensed petroleum solvent to the dry cleaning means for reuse in a subsequent fabric washing cycle.

8. The system of claim 7 wherein the condensing liquid delivering means includes a conduit exterior of the gravitational separator, and the condensing liquid make-up means comprises a condensing liquid make-up conduit having a condensing liquid level responsive valve therein and connected in liquid delivering relation to the conduit.

9. A dry cleaning process incorporating a solvent recovery technique, comprising:
  (a) steps for cleaning soiled fabrics with a petroleum solvent which is liquid at atmospheric temperature and pressure, including:
    (i) agitating the soiled fabrics and liquid petroleum solvent in a dry cleaning unit to transfer contaminants from the fabric to the solvent; then
    (ii) extracting the liquid petroleum solvent; then
    (iii) drying the fabrics including passing a gas having a low boiling point through and around the fabrics at a temperature sufficiently high to vaporize the petroleum solvent remaining on the fabric and produce a gas-solvent vapor mixture; and,
  (b) steps for recovering solvent from the gas-solvent vapor mixture, including:
    (i) admitting the gas-solvent vapor mixture to a spray chamber;
    (ii) spraying a condensing liquid at a temperature below the boiling point of the solvent and above the boiling point of the gas into the gas-solvent vapor mixture for condensing the solvent vapors in the spray chamber, the temperature of the gas-solvent vapor mixture being greater than that of the condensing liquid for heating the condensing liquid;
    (iii) passing the resulting mixture of condensing liquid and liquid petroleum solvent into a separator;
    (iv) separating the liquid petroleum solvent liquid from the condensing liquid in the separator;
    (v) recycling the solvent liquid to the dry cleaning unit;
    (vi) passing fluid at a temperature below that of the condensing liquid in heat exchanging relationship with the condensing liquid at a location downstream of the spraying location and thereby heating the fluid; and,
    (vii) using the heated fluid.

10. The process of claim 9 further comprising the step of removing lint from the gas-solvent vapor mixture prior to the gas-solvent vapor mixture's being admitted to the spray chamber.

11. The process of claim 9 further comprising the steps of utilizing the condensing liquid as a means for removing lint from the gas-solvent vapor mixture, and removing lint from the resulting mixture of condensing liquid and liquid petroleum solvent.

12. The process of claim 9 wherein the low boiling point gas is air and the process further comprises the step of venting air which has been separated from the gas-solvent vapor mixture to the atmosphere.

13. The process of claim 9 wherein the fluid is water.

14. A dry cleaning process incorporating a solvent recovery technique, comprising:
  (a) steps for cleaning soiled fabrics with a petroleum solvent of lower specific gravity than water which is liquid at atmospheric temperature and pressure, including:
    (i) agitating the soiled fabrics and liquid petroleum solvent in a dry cleaning unit to transfer contaminants from the fabric to the solvent; then
    (ii) extracting the liquid petroleum solvent; then
    (iii) drying the fabrics including passing a gas having a low boiling point through and around the fabrics at a temperature sufficiently high to vaporize the petroleum solvent remaining on the fabric and produce a gas-solvent vapor mixture; and,
  (b) steps for recovering solvent from the gas-solvent vapor mixture, including:
    (i) admitting the gas-solvent vapor mixture to a spray chamber;
    (ii) spraying liquid water at a temperature below the boiling point of the solvent and above the boiling point of the gas into the gas-solvent mixture for condensing the solvent vapors in the spray chamber;
    (iii) passing the resulting mixture of water and liquid petroleum solvent into a separator;
    (iv) separating the liquid petroleum solvent liquid from the condensing liquid in the separator;
    (v) passing the solvent liquid mixture from the separator into a gravitational settling tank;
    (vi) further separating solvent liquid in the gravitational settling tank;
    (vii) temporarily storing the further separated solvent liquid in a storage tank; and,
    (viii) recycling the solvent liquid to the dry cleaning unit.

15. A system for recovering petroleum solvent vapor discharged from a dry cleaning dryer as a heated mixture of air and petroleum solvent vapor, the system comprising:
  (a) condensing chamber means for receiving the heated mixture of air and petroleum solvent vapor;
  (b) spraying means within the condensing chamber for directing a spray of relatively cool condensing liquid into the relatively heated mixture of air and petroleum solvent vapor for condensing the petroleum solvent vapor therefrom;
  (c) gravitational separation means in communication with the condensing chamber for receiving the resulting relatively hot mixture of condensing liquid and liquid petroleum solvent and for effecting a gravitational separation of the condensing liquid and the liquid petroleum solvent; and,
  (d) heat exchange means for withdrawing heat energy from liquid within the vessel for use in a heat consuming devise.

16. The system of claim 15 wherein the separating means comprises:
  (a) a first gravitational separator having a first vessel of substantial capacity having a condensing liquid outlet in communication with the condensing chamber, and having a solvent outlet; and,
  (b) a second gravitational separator having a second vessel of smaller capacity than the first vessel, the second vessel being in communication with the solvent outlet of the first vessel.

17. A process for recovering petroleum solvent vapors discharged from a dry cleaning dryer in a heated mixture of air and petroleum solvent vapor comprising the steps of:

(a) admitting the heated mixture of air and petroleum solvent vapor into a spray chamber;

(b) spraying a relatively cool condensing liquid into the relatively heated mixture of air and petroleum solvent vapor for condensing solvent vapors;

(c) withdrawing the resulting relatively hot mixture of condensing liquid and liquid petroleum solvent into a vessel;

(d) gravitational separating the liquid petroleum solvent from the condensing liquid; and, (e) withdrawing heat energy from liquid within the vessel for use in a heat consuming device.

18. The process of claim 17 further comprising the step of removing lint from the heated mixture of air and petroleum solvent vapor prior to this mixture's being admitted to the spray chamber.

19. The process of claim 18 further comprising the steps of utilizing the condensing liquid as a means of removing lint from the heated mixture for air and petroleum solvent vapor, and removing lint from the resulting mixture of condensing liquid and liquid petroleum solvent.

* * * * *